(12) United States Patent
Kwon (10) Patent No.: US 9,428,141 B2
(45) Date of Patent: Aug. 30, 2016

(54) DRIVER AIRBAG APPARATUS

(71) Applicant: HYUNDAI MOBIS Co., Ltd., Yongin-si, Gyeonggi-do (KR)

(72) Inventor: Hae Wook Kwon, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/822,999

(22) Filed: Aug. 11, 2015

(65) Prior Publication Data

US 2016/0046256 A1 Feb. 18, 2016

(30) Foreign Application Priority Data

Aug. 14, 2014 (KR) ........................ 10-2014-0106195

(51) Int. Cl.
| | | |
|---|---|---|
| B60R 21/239 | (2006.01) | |
| B60R 21/2338 | (2011.01) | |
| B60R 21/216 | (2011.01) | |
| B60R 21/203 | (2006.01) | |

(52) U.S. Cl.
CPC ........... B60R 21/239 (2013.01); B60R 21/216 (2013.01); B60R 21/2338 (2013.01); B60R 21/203 (2013.01); B60R 2021/2161 (2013.01); B60R 2021/2395 (2013.01); B60R 2021/23382 (2013.01)

(58) Field of Classification Search
CPC .............. B60R 21/239; B60R 21/203; B60R 21/2338; B60R 2021/2395; B60R 2021/23382

USPC ................................................. 280/736, 742
See application file for complete search history.

(56) References Cited

U.S. PATENT DOCUMENTS

| | | | | |
|---|---|---|---|---|
| 6,095,557 A | * | 8/2000 | Takimoto ............ | B60R 21/2338 280/739 |
| 7,021,656 B2 | * | 4/2006 | Okamoto ............ | B60R 21/2165 180/274 |
| 2008/0073893 A1 | * | 3/2008 | Schneider ........... | B60R 21/2338 280/740 |
| 2010/0001495 A1 | * | 1/2010 | Sekino .................. | B60R 21/231 280/729 |
| 2010/0109303 A1 | * | 5/2010 | Abe ..................... | B60R 21/2338 280/739 |
| 2010/0201107 A1 | * | 8/2010 | Abe ..................... | B60R 21/2338 280/730.1 |
| 2011/0309605 A1 | * | 12/2011 | Kumagai ............ | B60R 21/2338 280/741 |
| 2012/0306187 A1 | * | 12/2012 | Mendez .............. | B60R 21/2338 280/743.2 |
| 2014/0217712 A1 | * | 8/2014 | Nakamura .......... | B60R 21/2338 280/739 |
| 2014/0300094 A1 | * | 10/2014 | Williams ............. | B60R 21/239 280/743.2 |

\* cited by examiner

*Primary Examiner* — Darlene P Condra
(74) *Attorney, Agent, or Firm* — Paratus Law Group, PLLC (57) ABSTRACT

Provided is a driver airbag apparatus capable of adjusting deployment pressure of an airbag by adjusting an amount of gas discharged to the outside of the airbag. To this end, according to the airbag apparatus according to an exemplary embodiment of the present invention, a vent cover and a tether are installed to the airbag, and a vent hole formed in the airbag is opened or shielded by the vent cover and the tether.

12 Claims, 10 Drawing Sheets

DRIVER AIRBAG APPARATUS

CROSS-REFERENCE TO RELATED APPLICATIONS

The present application claims priority to Korean Patent Application Number 10-2014-0106195 filed Aug. 14, 2014, the entire contents of which the application is incorporated herein for all purposes by this reference.

TECHNICAL FIELD

The present invention relates to a driver airbag apparatus, and more particularly, to a driver airbag apparatus installed in a steering wheel.

BACKGROUND

In general, airbag apparatuses are mounted in a vehicle in order to protect occupants using cushioning force at the time of an accident.

The airbag apparatuses are installed at various locations in the vehicle, and representatively, there are a driver airbag apparatus which is mounted in a steering wheel to protect a driver, and a passenger airbag apparatus which is mounted at an upper side of a glove box to protect a passenger seated in a front passenger seat.

The airbag apparatuses each include an inflator which generates gas, and an airbag which is inflated when the gas generated by the inflator flows into the airbag to protect the occupant.

When designing deployment pressure of the airbag included in the driver airbag apparatus among the airbag apparatuses, the airbag is designed so that a typical adult person having a weight of about 65 kg may not be injured due to deployment pressure of the airbag.

However, in a case in which a driver is an adult person who has a smaller body than the typical adult person, the driver is likely to be injured due to the deployment pressure of the airbag. Therefore, it is necessary to adjust the deployment pressure of the airbag included in the driver airbag apparatus.

SUMMARY

The present invention has been made in an effort to provide a driver airbag apparatus capable of adjusting deployment pressure of an airbag by adjusting an amount of gas discharged to the outside of the airbag.

Technical problems of the present invention are not limited to the aforementioned technical problem, and other technical problems, which are not mentioned above, may be clearly understood by those skilled in the art from the following descriptions.

An exemplary embodiment of the present invention provides a driver airbag apparatus including: an airbag which is inflated when gas flows into the airbag, and has a vent hole through which gas is discharged, and a cushion hole which is formed to be adjacent to the vent hole; a vent cover which is coupled to an outer surface of the airbag so as to correspond to the vent hole; and a tether which penetrates the cushion hole and the vent cover, and pulls the vent cover when the airbag is inflated so that the vent cover shields the vent hole.

Other detailed matters of the exemplary embodiment are included in the detailed description and the drawings.

The driver airbag apparatus according to the exemplary embodiment of the present invention discharges gas while the airbag is being inflated, thereby preventing the driver from being injured by excessively high initial deployment pressure of the airbag.

Discharge of gas is blocked when the airbag is fully inflated, and as a result, the airbag may protect the driver with appropriate pressure.

Even though the driver comes into contact with the airbag after the airbag is fully inflated, the airbag may maintain a state in which discharge of gas is blocked, thereby maintaining appropriate pressure that may protect the driver.

The effect of the present invention is not limited to the aforementioned effect, and other effects, which are not mentioned above, will be clearly understood by those skilled in the art from the claims.

DETAILED DESCRIPTION

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, a driver airbag apparatus according to exemplary embodiments of the present invention will be described with reference to the drawings.

Figure 1:
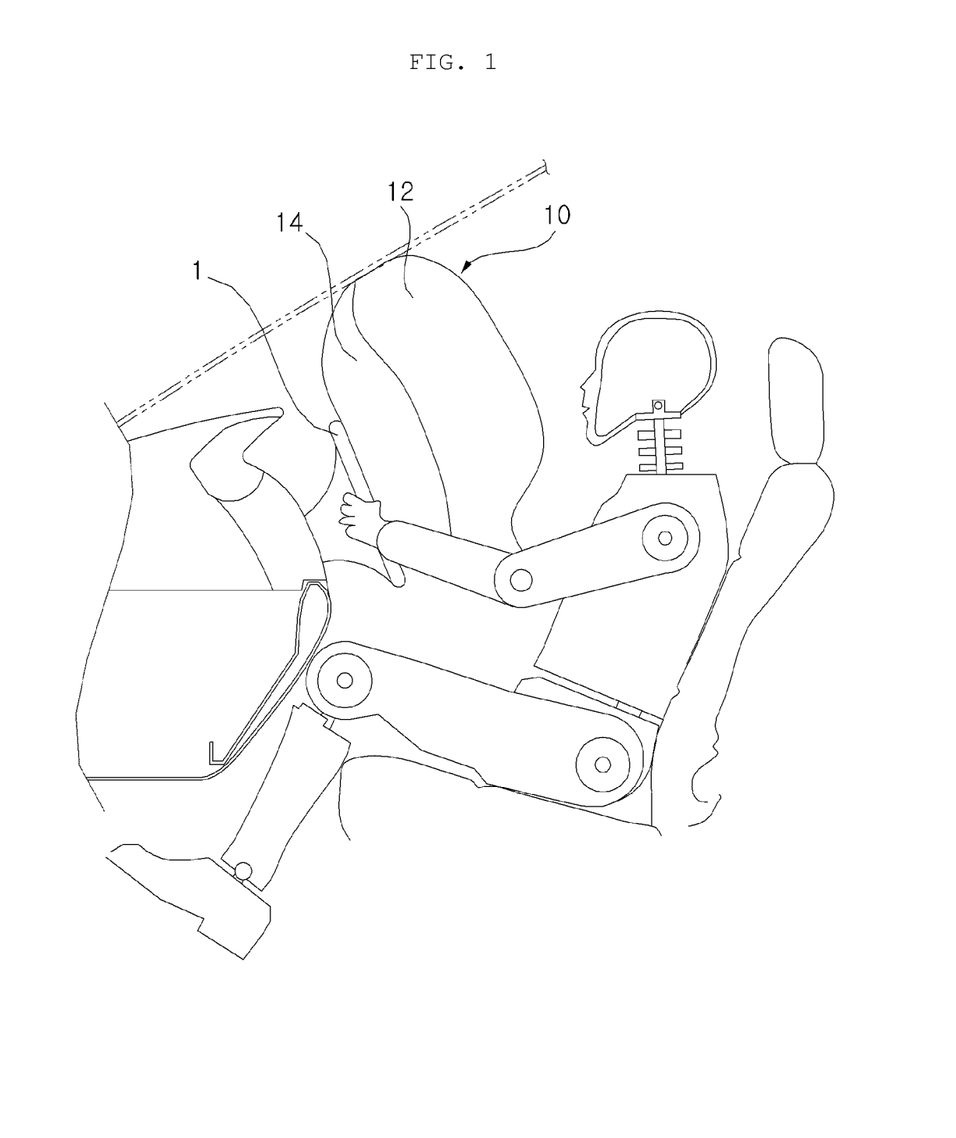
FIG. 1 is a side view illustrating an airbag of a driver airbag apparatus according to a first exemplary embodiment of the present invention.

FIG. 1 is a side view illustrating an airbag of a driver airbag apparatus according to a first exemplary embodiment of the present invention.

Referring to FIG. 1, the driver airbag apparatus according to the first exemplary embodiment of the present invention is mounted in a steering wheel 1 in a vehicle. The steering wheel 1 is disposed in front of a driver seat and used to control a direction in which the vehicle travels.

The driver airbag apparatus includes an inflator (not illustrated) which generates gas, and an airbag 10 which is inflated when the gas generated by the inflator flows into the airbag 10.

An insertion hole (not illustrated) into which a head portion of the inflator is inserted is formed at a rear side of the airbag 10. The head portion of the inflator, which discharges gas, is inserted into the insertion hole, and then may be coupled to the airbag 10 by bolting.

When gas generated by the inflator flows into the airbag 10 at the time of an accident of the vehicle, the airbag 10 is deployed forward toward a driver.

The airbag 10 is manufactured by using two flexible panels. That is, the airbag 10 includes a front panel 12, and a rear panel 14 coupled to the front panel 12. The front panel 12 and the rear panel 14 are formed in a circular shape. The airbag 10 is completely manufactured by bringing the front panel 12 and the rear panel 14 into direct contact with each other and then sewing together the circumferences of the front panel 12 and the rear panel 14.

The front panel 12 defines a front side of the airbag 10 which is directed toward the driver, and the rear panel 14 defines a rear side of the airbag 10 which is directed toward the steering wheel 1. Hereinafter, a front surface of the airbag 10 means the front panel 12, and a rear surface of the airbag 10 means the rear panel 14.

When the airbag 10 is fully inflated, the driver comes into contact with the front surface of the airbag 10 so as to be protected by cushioning force caused by gas pressure in the airbag 10.

Figure 2:
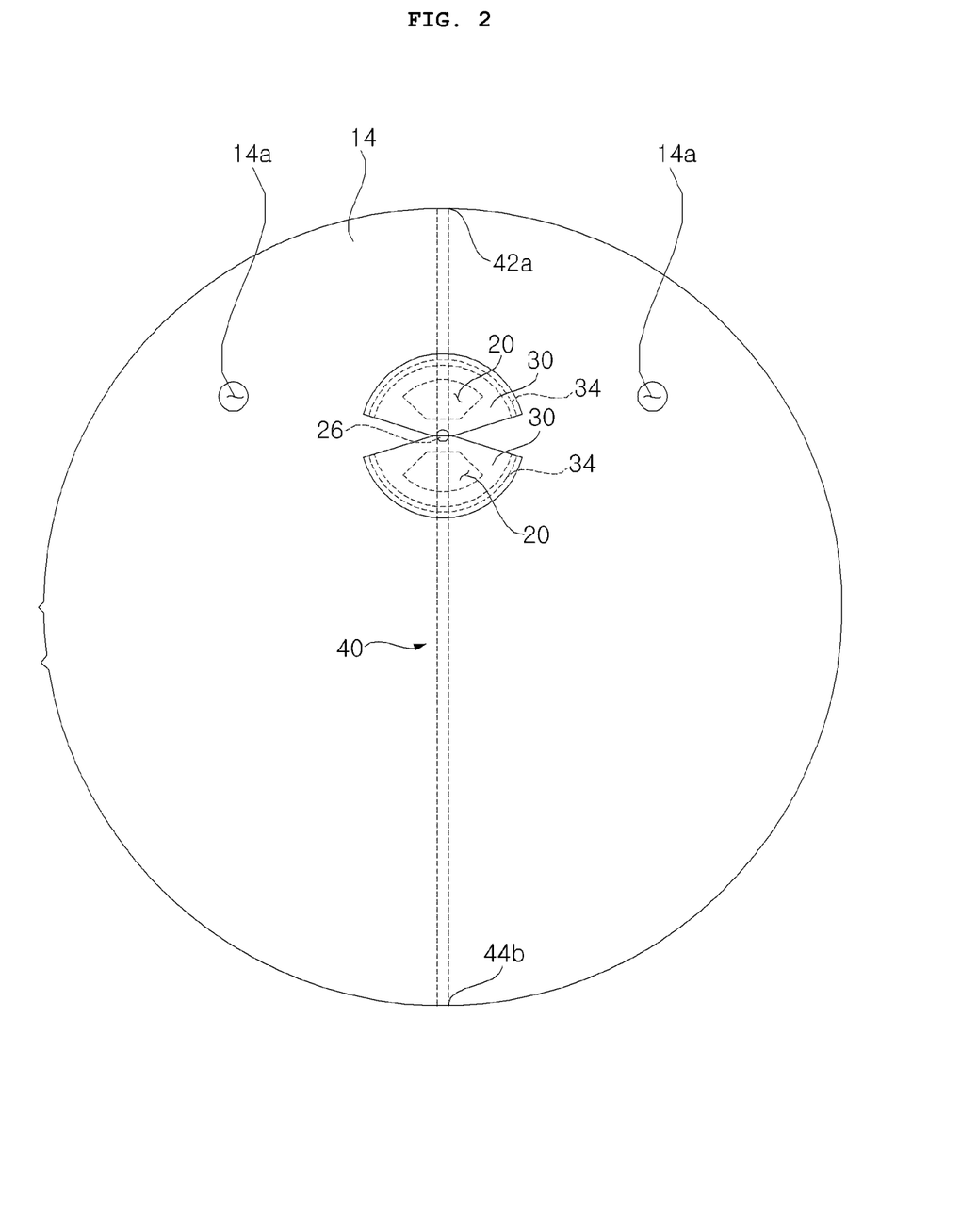
FIG. 2 is a view illustrating a state in which a vent cover and a tether are installed to a rear panel illustrated in FIG. 1.
Figure 3:
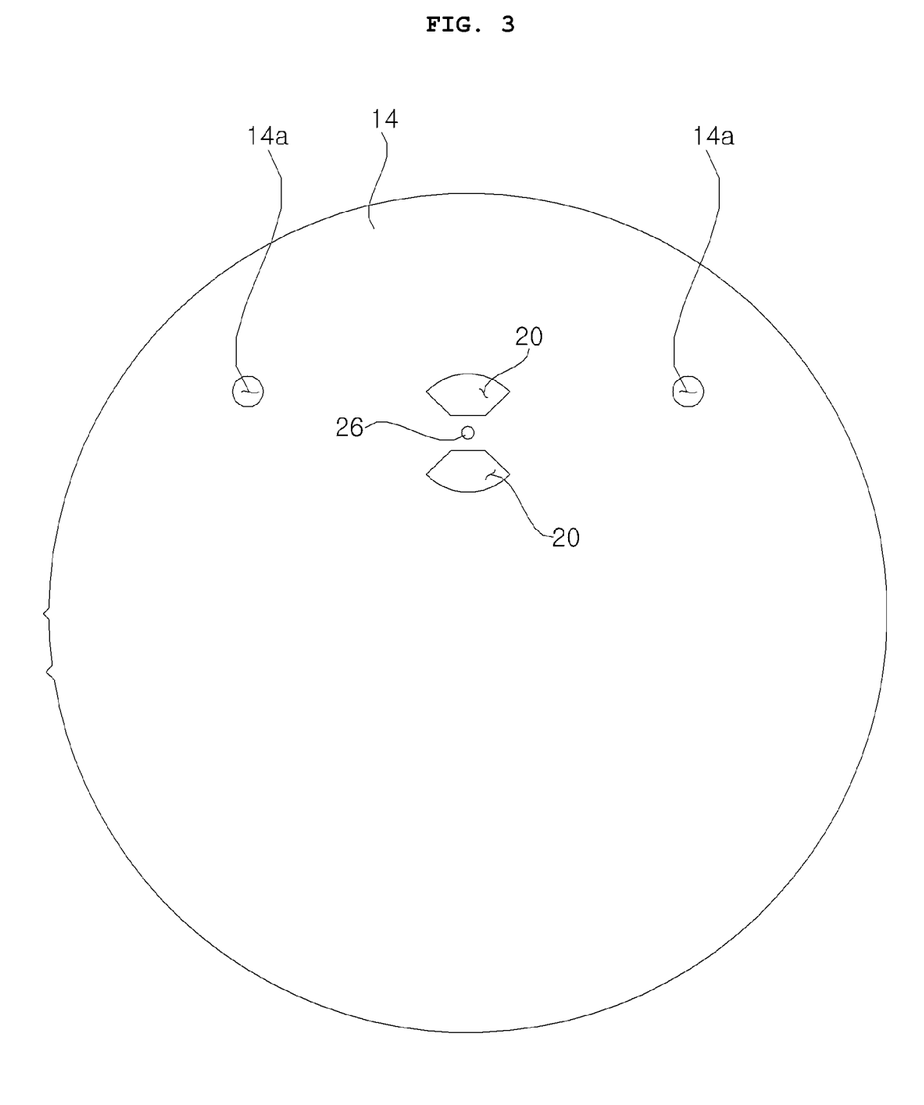
FIG. 3 is a view illustrating the rear panel illustrated in FIG. 2.
Figure 4:
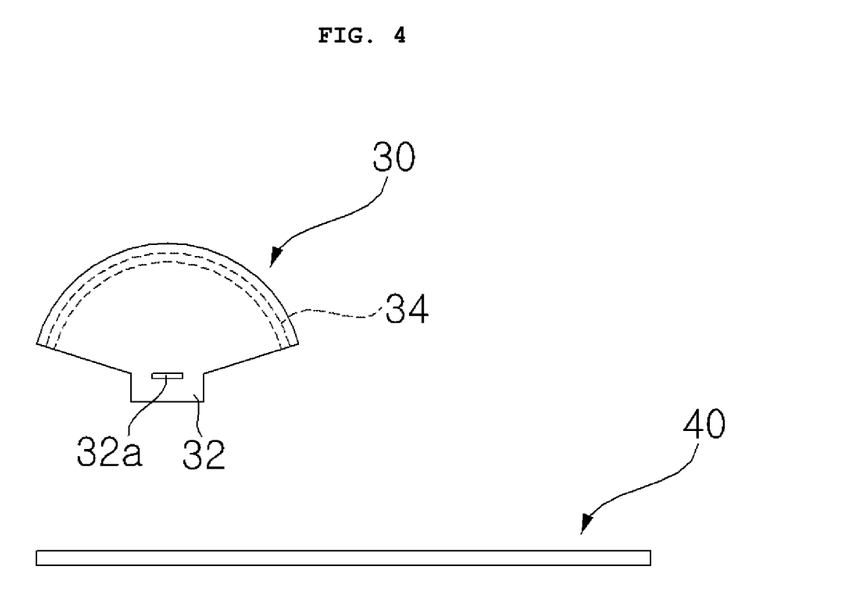
FIG. 4 is a view illustrating the vent cover and the tether illustrated in FIG. 2.

FIG. 2 is a view illustrating a state in which a vent cover and a tether are installed to the rear panel illustrated in FIG. 1, FIG. 3 is a view illustrating the rear panel illustrated in FIG. 2, and FIG. 4 is a view illustrating the vent cover and the tether illustrated in FIG. 2.

Referring to FIGS. 2 to 4, main vent holes 14a and vent holes 20 through which gas in the airbag 10 is discharged are formed in the rear panel 14. Of course, the insertion hole into which the inflator is inserted is also formed in the rear panel 14. However, the insertion hole is not illustrated in the drawing.

The main vent hole 14a is formed in a circular shape, and the number of main vent holes 14a is more than one. In the present exemplary embodiment, two main vent holes 14a are formed in the rear panel 14. The main vent hole 14a continuously discharges gas while the airbag 10 is being inflated.

The vent hole 20 is formed in a fan shape, and the number of vent holes 20 is more than one. In the present exemplary embodiment, two vent holes 20 are formed in the rear panel 14. The two vent holes 20 have the same shape. One vent hole 20 is referred to as a first vent hole, and the other vent hole 20 is referred to as a second vent hole.

In order to adjust an amount of gas discharged to the outside of the airbag 10 through the vent holes 20, vent covers 30 and a tether 40 are further installed to the airbag 10, and a cushion hole 26, which is a passage through which the vent covers 30 and the tether 40 are moved, is formed in the rear panel 14.

The vent cover 30 and the tether 40 are made of a flexible material. The vent cover 30 and the tether 40 may be made of the same material as the airbag 10.

The vent cover 30 is formed in a fan shape corresponding to the shape of the vent hole 20, disposed at a position corresponding to the vent hole 20, and then coupled to an outer surface of the rear panel 14. One side 34 of the vent cover 30 based on the vent hole 20 is coupled to the airbag 10 by sewing, and the tether 40 penetrates the other side 32 based on the vent hole 20.

The tether 40 is coupled to the vent cover 30. When the airbag 10 is inflated, the tether 40 is tightened to pull the vent cover 30 so that the vent cover 30 may shield the vent hole 20. The vent cover 30 may have an area that may shield the vent hole 20. In addition, the tether 40 may penetrate the vent cover 30 and then be coupled to the vent cover 30. A through hole 32a which the tether 40 penetrates may be formed in the vent cover 30.

The number of vent covers 30 is more than one, and the number of vent covers 30 corresponds to the number of vent holes 32a. That is, in the present exemplary embodiment, two vent covers 30 are provided. The two vent covers 30 have the same shape and structure. One vent cover of the two vent covers 30, which is disposed at a position corresponding to the first vent hole, is referred to as a first vent cover, and the other vent cover, which is disposed at a position corresponding to the second vent hole, is referred to as a second vent cover. In a case in which a single vent hole 20 is formed in the airbag 10, a single vent cover 30 may be provided.

The cushion hole 26 is formed in a portion of the rear panel 14 which is adjacent to the vent hole 20. The cushion hole 26 is formed to have a smaller size than the vent hole 20, and in the present exemplary embodiment, the cushion hole 26 is formed in a circular shape. In a case in which the two vent holes 20 are formed and the two vent covers 30 are provided as described in the present exemplary embodiment, the cushion hole 26 may be formed between the two vent holes 20, that is, between the first vent hole and the second vent hole.

Figure 5:
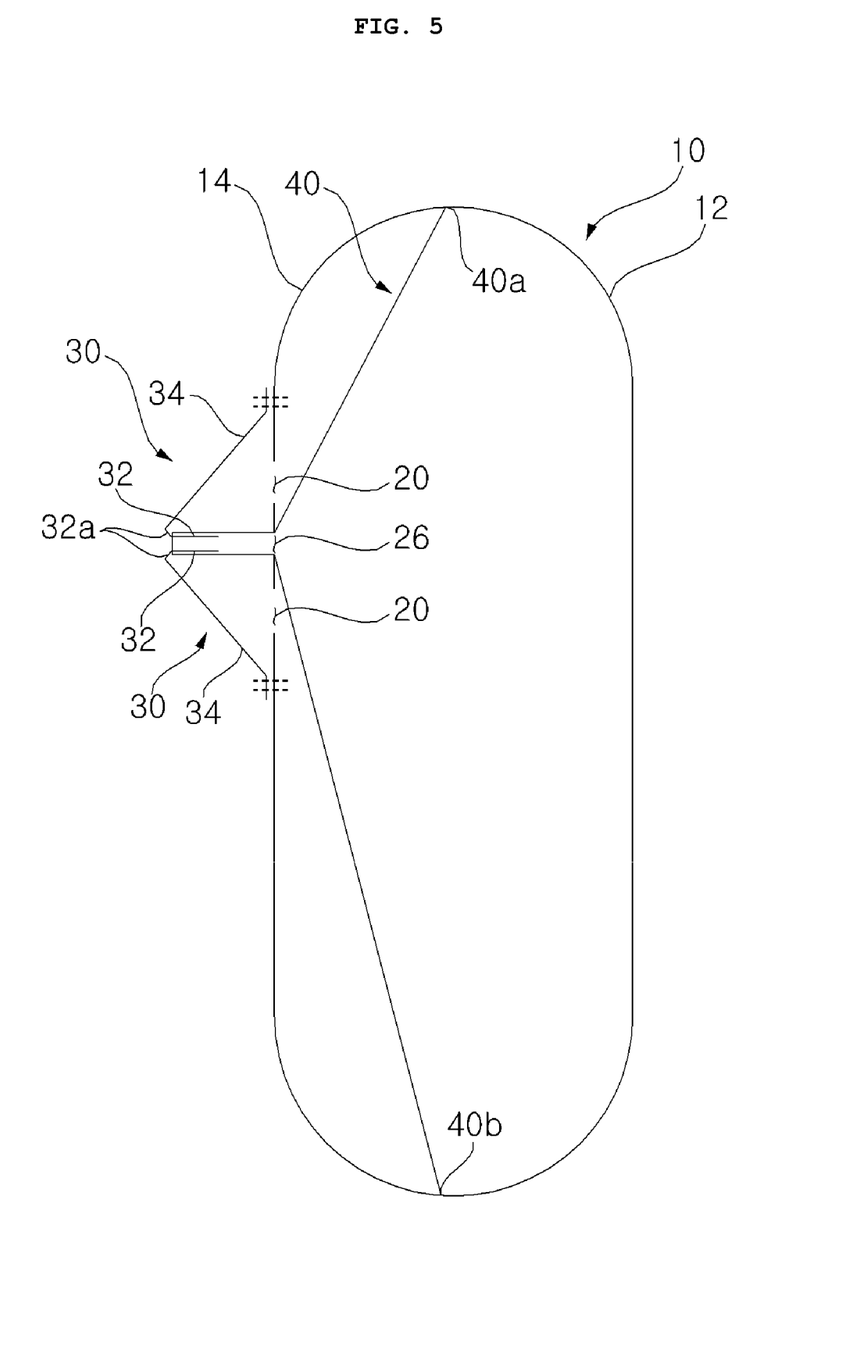
FIG. 5 is a cross-sectional side view illustrating a state while the airbag of the driver airbag apparatus according to the first exemplary embodiment of the present invention is being inflated.

FIG. 5 is a cross-sectional side view illustrating a state while the airbag of the driver airbag apparatus according to the first exemplary embodiment of the present invention is being inflated.

Referring to FIG. 5, the tether 40 penetrates the cushion hole 26 and the vent covers 30, and both ends 40a and 40b of the tether 40 are coupled to an inner surface of the airbag 10. That is, both ends 40a and 40b of the tether 40 are coupled to the airbag 10, and a portion of the tether 40 between both the ends 40a and 40b penetrates the cushion hole 26 and the vent covers 30. The tether 40 may have a length that may allow the tether 40 to be in a loosened state when the airbag 10 is initially deployed and may allow the tether 40 to become tightened as the airbag 10 is inflated so as to pull the vent covers 30.

Both ends 40a and 40b of the tether 40 are coupled to a lateral surface of the airbag 10 between the front panel 12 and the rear panel 14. When the airbag 10 is manufactured by sewing together the circumferences of the front panel 12 and the rear panel 14, both ends 40a and 40b of the tether 40 are inserted between the front panel 12 and the rear panel 14 and coupled to the front panel 12 and the rear panel 14 by sewing, such that both ends 40a and 40b of the tether 40 may be coupled to the lateral surface of the airbag 10 between the front surface and the rear surface of the airbag 10.

Since both ends 40a and 40b of the tether 40 are coupled to the lateral surface of the airbag 10 as described above, the tether 40 may be maintained in a tightened state even though the airbag 10 is pressed by the driver after the driver comes into contact with the front surface of the airbag 10. If both ends 40a and 40b of the tether 40 are coupled to the front surface of the airbag 10, the tether 40 becomes loosened when the airbag 10 is pressed by the driver after the driver comes into contact with the front surface of the airbag 10, and the vent covers 30 open the vent holes 20 due to gas pressure in the airbag 10, such that the airbag 10 cannot maintain appropriate pressure required to protect the driver because gas in the airbag 10 is discharged through the vent holes 20. However, in the present exemplary embodiment, since both ends 40a and 40b of the tether are coupled to the lateral surface of the airbag 10, the tether 40 may be maintained in a tightened state even though the airbag 10 is pressed by the driver after the driver comes into contact with the front surface of the airbag 10, and as a result, the vent covers 30 may maintain the vent holes 20 to a shielded state.

When both ends 40a and 40b of the tether 40 are coupled to the lateral surface of the airbag 10, both ends 40a and 40b of the tether 40 may be coupled to the opposing sides of the airbag 10. That is, one end 40a of the tether 40 is coupled to one side of the airbag 10, and the other end 40b of the tether 40 is coupled to the other side of the airbag 10, such that the tether becomes further tightened as the airbag 10 expands toward lateral sides thereof when the driver comes into contact with the front surface of the airbag 10, and as a result, even though gas pressure in the airbag 10 is increased as the driver comes into contact with the airbag 10, it is possible to prevent the vent covers 30 from opening the vent holes 20 due to the increased gas pressure in the airbag 10.

Figure 6:
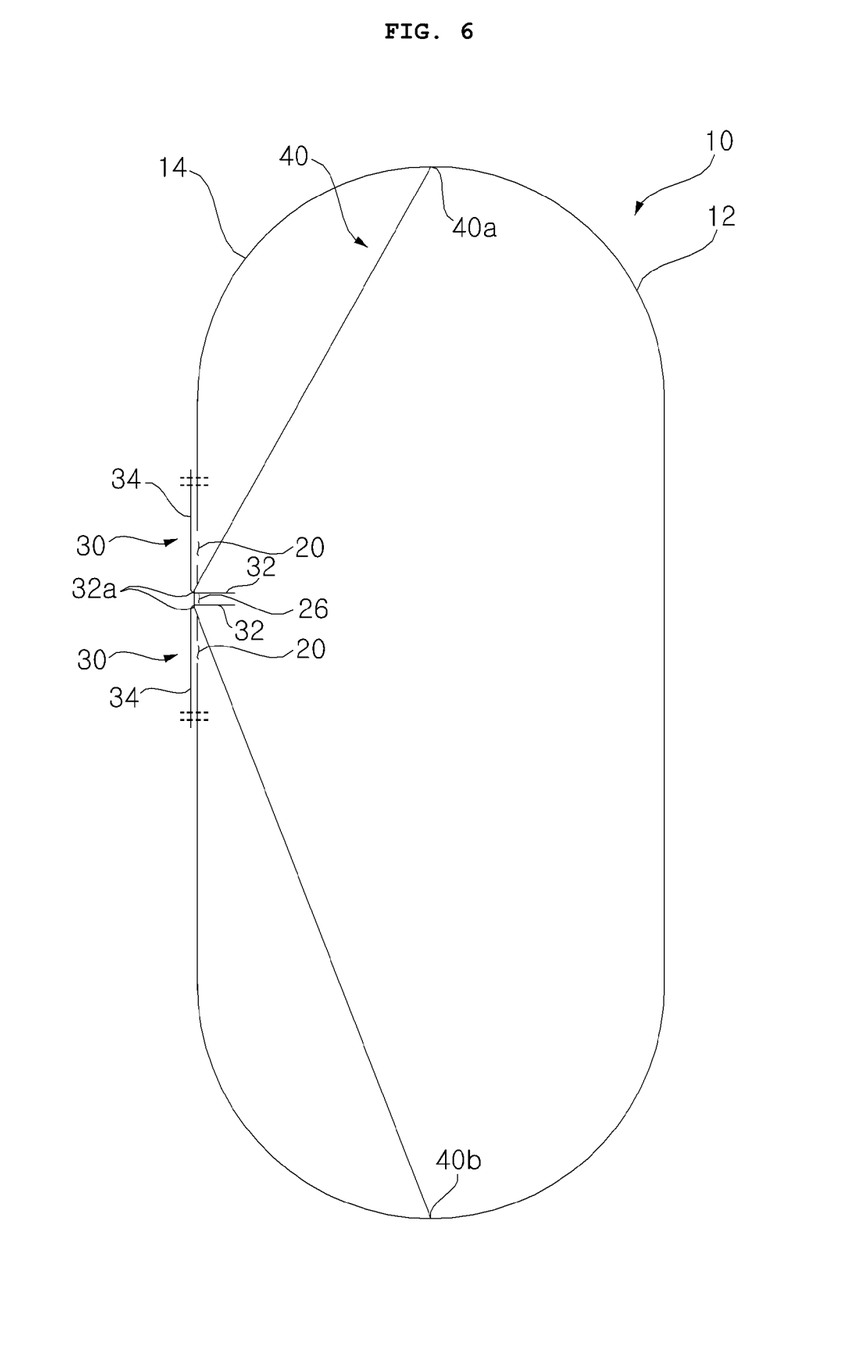
FIG. 6 is a cross-sectional side view illustrating a state in which the airbag of the driver airbag apparatus according to the first exemplary embodiment of the present invention is fully inflated.

FIG. 6 is a cross-sectional side view illustrating a state in which the airbag of the driver airbag apparatus according to the first exemplary embodiment of the present invention is fully inflated.

Referring to FIG. 6, when the airbag 10 is fully inflated, the vent covers 30 are pulled by the tightened tether 40 and shield the vent holes 20. Therefore, the airbag 10 may protect the driver with appropriate pressure.

An operation of the driver airbag apparatus according to the first exemplary embodiment of the present invention, which is configured as described above, will be described below with reference to FIGS. 5, 7 and 8.

Figure 7:
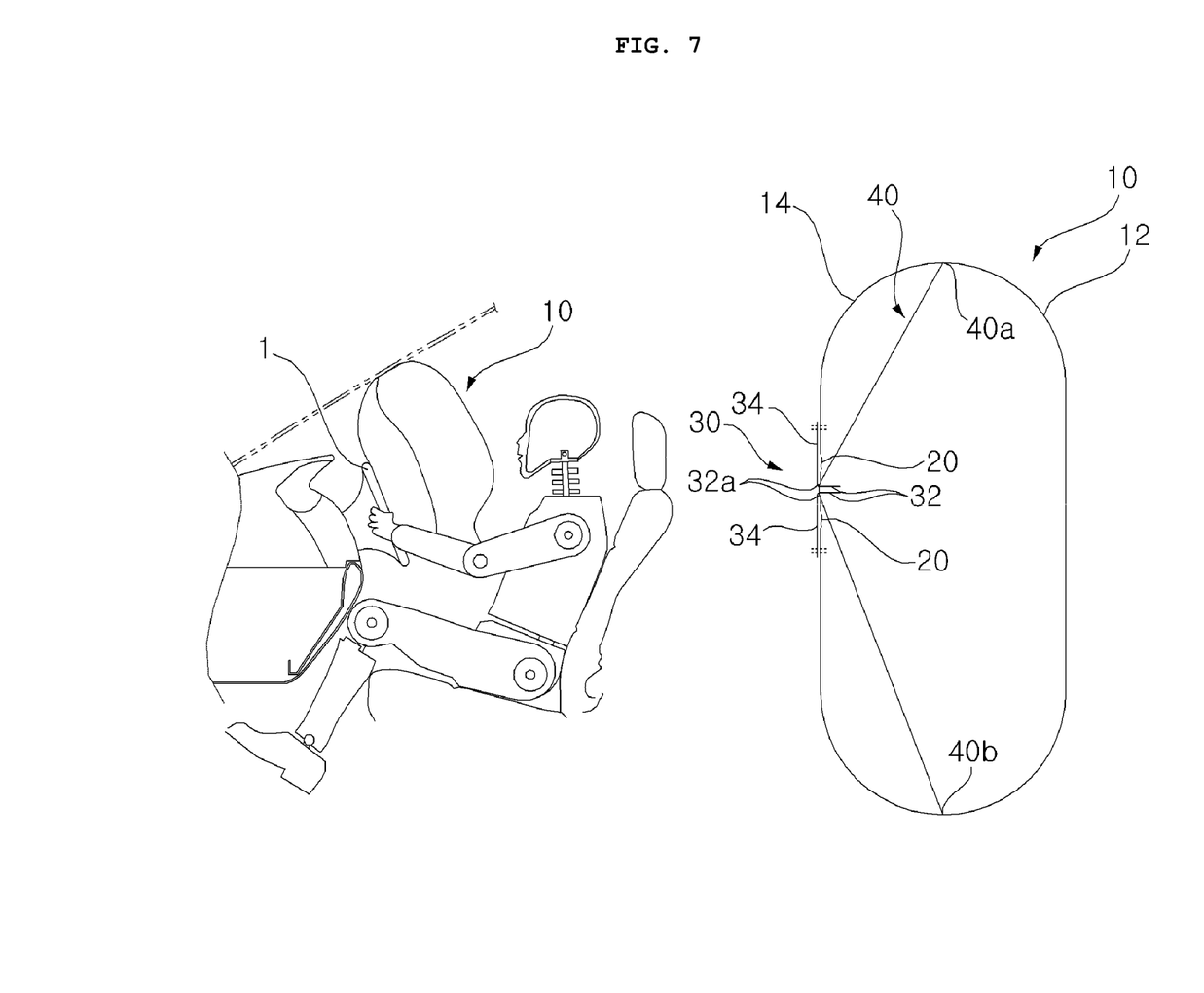
FIGS. 7 and 8 are views for explaining an operation of the driver airbag apparatus according to the first exemplary embodiment of the present invention.
Figure 8:
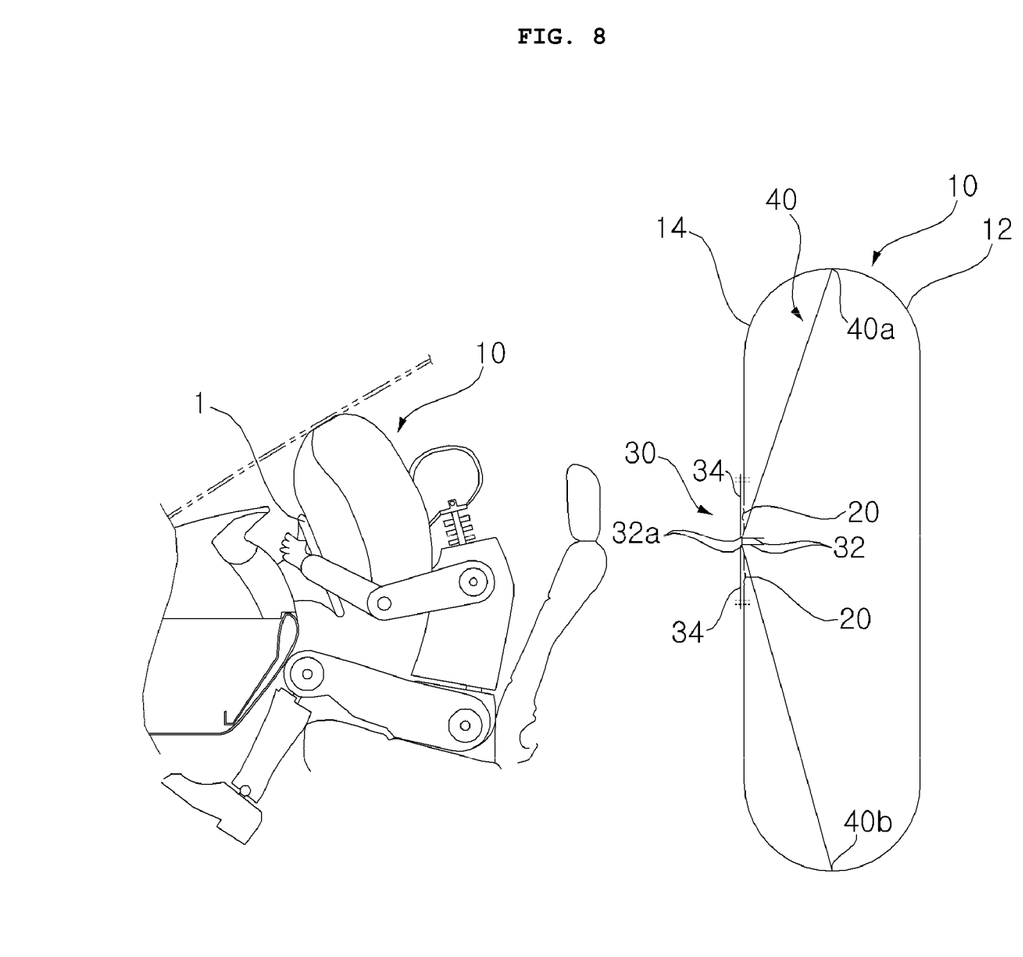

FIGS. 7 and 8 are views for explaining an operation of the driver airbag apparatus according to the first exemplary embodiment of the present invention.

Referring to FIG. 5, at the time of an accident of the vehicle, the inflator generates gas, and the airbag 10 begins to be deployed while being inflated as gas generated by the inflator flows into the airbag 10.

The tether 40 is placed in a loosened state when the airbag is initially deployed. Therefore, while the airbag 10 is being inflated, the vent covers 30 open the vent holes 20 while protruding toward the outside of the airbag 10 due to pressure of gas in the airbag 10 which is discharged through the vent holes 20. Since the vent covers 30 and the tether 40 are installed to be movable through the cushion hole 26, when the vent covers 30 protrude toward the outside of the airbag 10 due to pressure of gas in the airbag 10 which is discharged through the vent holes 20, the tether 40 is tightened while being moved along with the vent covers 30.

Thereafter, the tether 40 prevents the vent covers 30 from further protruding toward the outside of the airbag 10, and allows gas in the airbag 10, which is discharged through the vent holes 20, to be discharged between the vent covers 30 and the airbag 10.

Since the gas in the airbag 10 is discharged through the vent holes 20 while the airbag 10 is being inflated as described above, initial deployment pressure of the airbag 10 is decreased. Therefore, even though the driver comes into contact with the front surface of the airbag 10 while the airbag 10 is being inflated, the driver is not injured by the initial deployment pressure of the airbag 10.

Referring to FIG. 7, the airbag 10 is fully inflated immediately before the driver comes into contact with the airbag 10. When the airbag 10 is fully inflated, the tether 40 becomes tightened as both ends 40a and 40b are pulled by the airbag 10, and the tether 40 pulls the vent covers 30. Therefore, the vent covers 30 shield the vent holes 20 while being pulled by the tether 40, and as a result, gas in the airbag 10 is not discharged any more through the vent holes 20.

As described above, since the gas in the airbag 10 is not discharged through the vent holes 20 when the airbag 10 is fully inflated, when the driver comes into contact with the front surface of the airbag 10, the driver is protected by appropriate deployment pressure of the airbag 10.

Referring to FIG. 8, when the driver comes into contact with the front surface of the airbag 10 after the airbag 10 is fully inflated, the airbag 10 expands toward the lateral sides thereof by being pressed by the driver. It can be seen that a vertical length of the airbag 10 is longer in FIG. 8 than in FIG. 7 as the airbag 10 expands toward the lateral sides thereof.

When the airbag 10 expands toward the lateral sides thereof as described above, the tether 40 becomes further tightened and pulls the vent covers 30 with higher force. That is, the tether 40 is maintained in a tightened state, and as a result, the vent covers 30 maintain a state of shielding the vent holes 20. Therefore, even though the airbag 10 is pressed by the driver as the driver comes into contact with the front surface of the airbag 10, the gas in the airbag 10 is not discharged through the vent holes 20, and as a result, the airbag 10 may maintain appropriate deployment pressure that may protect the driver.

Figure 9:
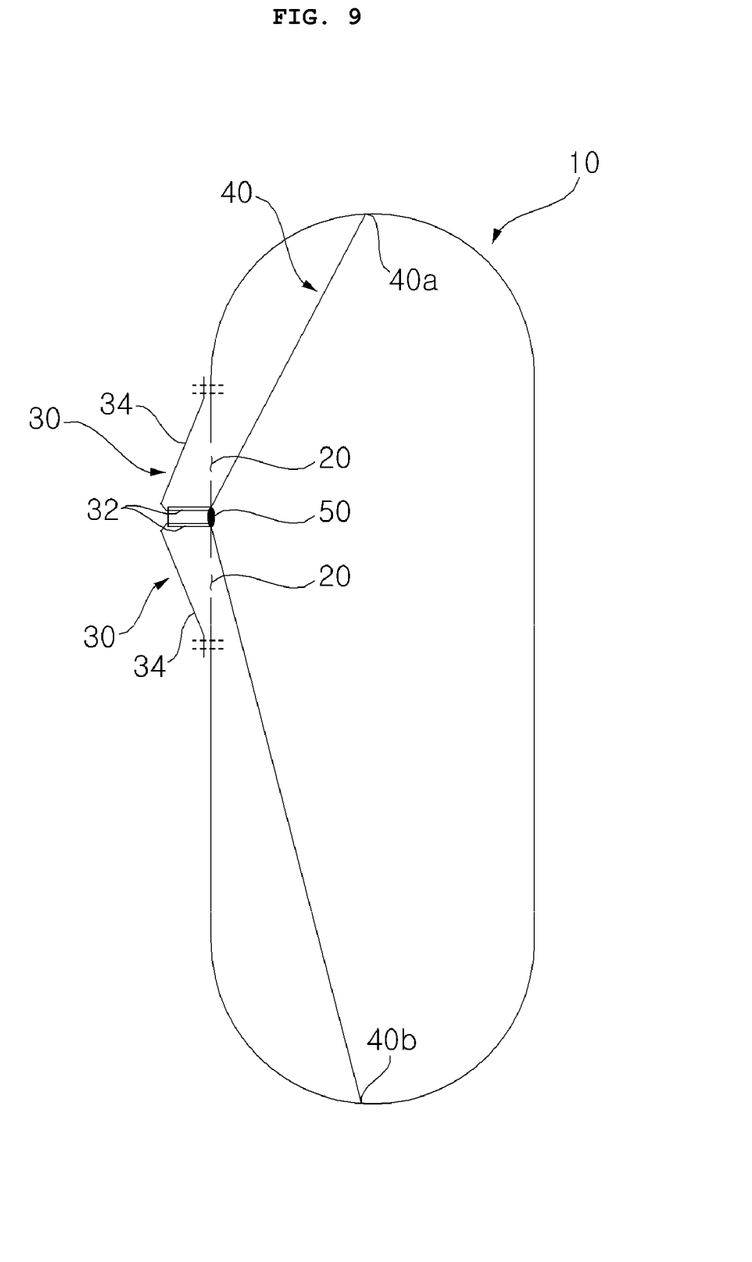
FIG. 9 is a cross-sectional side view illustrating a state while an airbag of a driver airbag apparatus according to a second exemplary embodiment of the present invention is being inflated.
Figure 10:
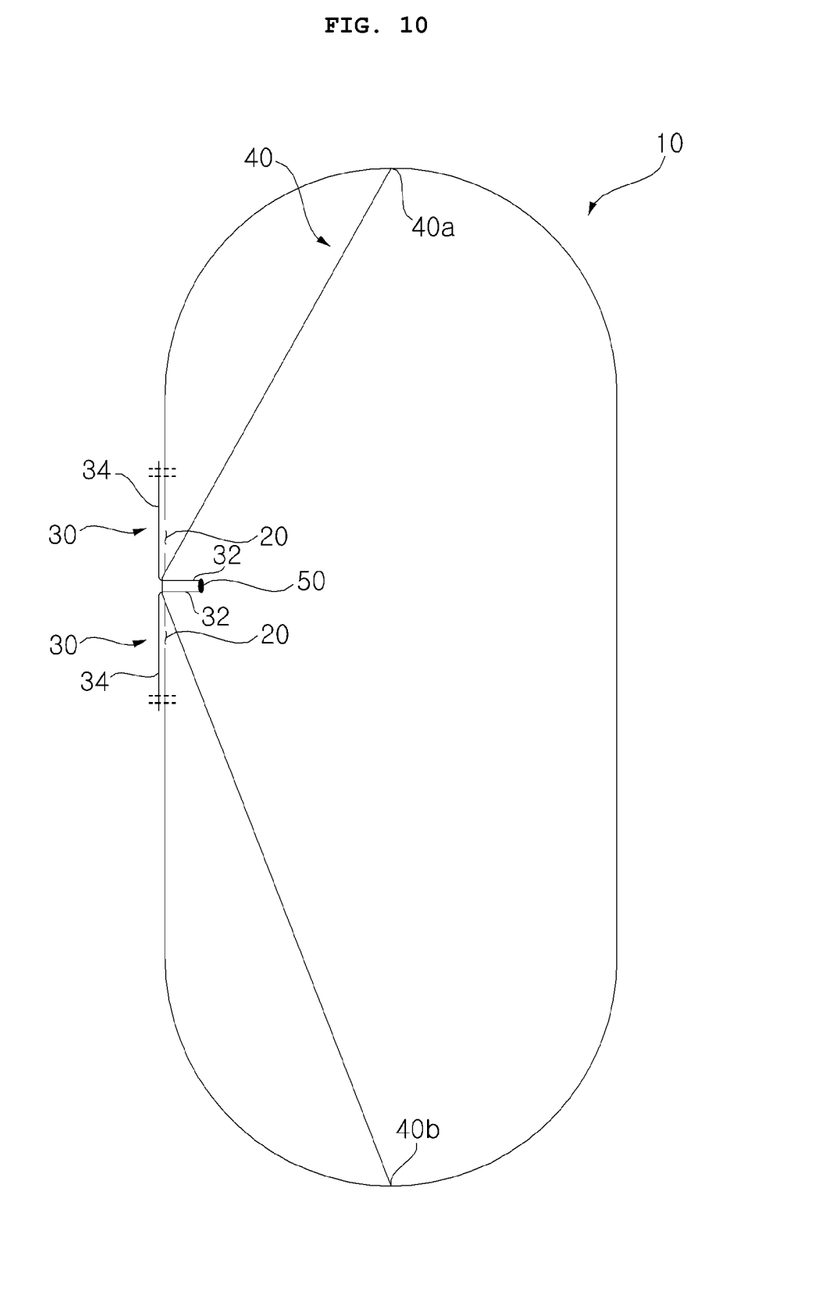
FIG. 10 is a cross-sectional side view illustrating a state in which the airbag of the driver airbag apparatus according to the second exemplary embodiment of the present invention is fully inflated.

FIG. 9 is a cross-sectional side view illustrating a state while an airbag of a driver airbag apparatus according to a second exemplary embodiment of the present invention is being inflated, and FIG. 10 is a cross-sectional side view illustrating a state in which the airbag of the driver airbag apparatus according to the second exemplary embodiment of the present invention is fully inflated. Hereinafter, like reference numerals refer to constituent elements identical to those of the aforementioned first exemplary embodiment, a description thereof will be omitted, and only the differences between the exemplary embodiments will be described.

Referring to FIGS. 9 and 10, it can be seen that the driver airbag apparatus according to the second exemplary embodiment of the present invention differs from the driver airbag apparatus according to the aforementioned first exemplary embodiment. That is, unlike the first exemplary embodiment, a blocking protrusion 50 is further formed at the one end 32 of the vent cover 30 in the present second exemplary embodiment. The blocking protrusion 50 is formed to have a larger size than the cushion hole 26 so as to block the cushion hole 26, and shields the cushion hole 26 when the vent cover 30 protrudes toward the outside of the airbag 10 due to pressure of gas in the airbag 10 which is discharged through the vent hole 20. When the blocking protrusion 50 shields the cushion hole 26 as described above, the gas in the airbag 10 is discharged only through the vent holes 20, and as a result, it is possible to adjust deployment pressure of the airbag 10 just by adjusting a degree to which the vent holes 20 are opened.

The blocking protrusion 50 serves to shield the cushion hole 26 as described above, and also serves to adjust a degree to which the vent cover 30 protrude toward the outside of the airbag 10. That is, in the aforementioned first exemplary embodiment, a degree to which the vent cover 30 protrudes toward the outside of the airbag 10 is adjusted by the tether 40, but in the present second exemplary embodiment, since the blocking protrusion 50 blocks the one end 32 of the vent cover 30 from being moved out of the airbag 10, a degree to which the vent cover 30 protrudes toward the outside of the airbag 10 may be adjusted by the blocking protrusion 50.

In a case in which the blocking protrusion 50 is formed at the one end 32 of the vent cover 30 as described above, the one end 32 of the vent cover 30 may be inserted into the cushion hole 26 and disposed in the airbag 10.

FIGS. 9 and 10 illustrate a configuration in which two vent holes 20 are formed, and two vent covers 30 are also provided. In this case, the first vent cover and the second vent cover may be connected to each other by the blocking protrusion 50. Of course, the blocking protrusion 50 may not connect the first vent cover and the second vent cover, and the blocking protrusions 50 may be formed at one end of the first vent cover and one end of the second vent cover, respectively.

As described above, the driver airbag apparatus according to the exemplary embodiment of the present invention discharges gas while the airbag 10 is being inflated, thereby preventing the driver from being injured by excessively high initial deployment pressure of the airbag 10.

Discharge of gas is blocked when the airbag 10 is fully inflated, and as a result, the airbag 10 may protect the driver with appropriate pressure.

Even though the driver comes into contact with the airbag after the airbag 10 is fully inflated, the airbag 10 may maintain a state in which discharge of gas is blocked, thereby maintaining appropriate pressure that may protect the driver.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. A driver airbag apparatus comprising:
   an airbag which is inflated when gas flows into the airbag, and has a vent hole through which gas is discharged, and a cushion hole which is formed to be adjacent to the vent hole;
   a vent cover which is coupled to an outer surface of the airbag so as to correspond to the vent hole; and
   a tether which penetrates the cushion hole and the vent cover, and pulls the vent cover when the airbag is inflated so that the vent cover shields the vent hole, wherein both ends of the tether are coupled to an inner surface of the airbag.

2. The driver airbag apparatus of claim 1, wherein a driver comes into contact with a front surface of the airbag, the vent hole and the cushion hole are formed in a rear surface of the airbag, and the both ends of the tether are coupled to a lateral surface of the airbag between the front surface of the airbag and the rear surface of the airbag.

3. The driver airbag apparatus of claim 1, wherein the airbag includes a front panel with which a driver comes into contact, and a rear panel which is coupled to the front panel and has the vent hole and the cushion hole, and the both ends of the tether are coupled between the front panel and the rear panel.

4. The driver airbag apparatus of claim 1, wherein one end of the tether is coupled to one side of the airbag, and the other end of the tether is coupled to the other side of the airbag.

5. The driver airbag apparatus of claim 1, wherein the vent cover and the tether are installed to be movable through the cushion hole.

6. The driver airbag apparatus of claim 1, wherein a through hole which the tether penetrates is formed in the vent cover.

7. The driver airbag apparatus of claim 1, wherein one side of the vent cover based on the vent hole is coupled to the airbag, and the tether penetrates the other side of the vent cover based on the vent hole.

8. The driver airbag apparatus of claim 1, wherein the tether is in a loosened state while the airbag is being inflated so that the vent cover opens the vent hole, the tether becomes tightened when the airbag is fully inflated and pulls the vent cover so that the vent cover shields the vent hole, and when a driver comes into contact with the airbag after the airbag is fully inflated, the tether is maintained in a tightened state so that the vent cover maintains a state of shielding the vent hole.

9. A driver airbag apparatus comprising:
   an airbag which is inflated when gas flows into the airbag, and has a vent hole through which gas is discharged, and a cushion hole which is formed to be adjacent to the vent hole;
   a vent cover which is coupled to an outer surface of the airbag so as to correspond to the vent hole; and
   a tether which penetrates the cushion hole and the vent cover, and pulls the vent cover when the airbag is inflated so that the vent cover shields the vent hole, wherein one end of the vent cover is inserted into the cushion hole and disposed in the airbag, and a blocking protrusion, which is larger than the cushion hole, is formed at one end of the vent cover.

10. A driver airbag apparatus comprising:
    an airbag which is inflated when gas flows into the airbag, and has a vent hole through which gas is discharged, and a cushion hole which is formed to be adjacent to the vent hole;
    a vent cover which is coupled to an outer surface of the airbag so as to correspond to the vent hole; and
    a tether which penetrates the cushion hole and the vent cover, and pulls the vent cover when the airbag is inflated so that the vent cover shields the vent hole, wherein the number of vent holes is more than one, the vent holes include a first vent hole and a second vent hole, and the number of vent covers is more than one, and the vent covers include a first vent cover which is disposed to correspond to the first vent hole, and a second vent cover which is disposed to correspond to the second vent hole, wherein the cushion hole is disposed between the first vent hole and the second vent hole.

11. The driver airbag apparatus of claim 10, wherein one end of the first vent cover and one end of the second vent cover are inserted into the cushion hole and disposed in the airbag, and the one end of the first vent cover and the one end of the second vent cover are connected by a blocking protrusion that is larger than the cushion hole.

12. The driver airbag apparatus of claim 10, wherein one end of the first vent cover and one end of the second vent cover are inserted into the cushion hole and disposed in the airbag, and blocking protrusions, which are larger than the cushion hole, are formed at the one end of the first vent cover and the one end of the second vent cover, respectively.

* * * * *